US012795532B2

(12) United States Patent
Ozozlu et al.

(10) Patent No.: US 12,795,532 B2
(45) Date of Patent: Nov. 10, 2026

(54) PRECISE NETWORK SEARCHING FOR EXTRATERRESTRIAL BASE STATIONS

(71) Applicant: T-MOBILE INNOVATIONS LLC, Overland Park, KS (US)

(72) Inventors: Akin Ozozlu, McLean, VA (US); Nagi A. Mansour, Arlington, VA (US); Kevin Almon Hart, Sammamish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 575 days.

(21) Appl. No.: 18/122,849

(22) Filed: Mar. 17, 2023

(65) Prior Publication Data

US 2024/0314680 A1 Sep. 19, 2024

(51) Int. Cl.

*H04W 48/20* (2009.01)
*H04W 48/16* (2009.01)
*H04W 64/00* (2009.01)
*H04W 84/06* (2009.01)

(52) U.S. Cl.

CPC ........... *H04W 48/20* (2013.01); *H04W 48/16* (2013.01); *H04W 64/00* (2013.01); *H04W 84/06* (2013.01)

(58) Field of Classification Search

CPC ..... H04W 48/20; H04W 48/16; H04W 64/00; H04W 84/06
USPC .......................................................... 370/329
See application file for complete search history.

(56) References Cited

U.S. PATENT DOCUMENTS

| | | | | |
|---|---|---|---|---|
| 2009/0156206 | A1 * | 6/2009 | Rathonyi | H04W 48/16 455/434 |
| 2025/0016721 | A1 * | 1/2025 | Edge | H04W 64/00 |
| 2025/0159595 | A1 * | 5/2025 | Wu | H04W 48/16 |

* cited by examiner

*Primary Examiner* — Jae Y Lee
*Assistant Examiner* — Haeshil Jessica Choi
(74) *Attorney, Agent, or Firm* — SHOOK, HARDY & BACON L.L.P.

(57) ABSTRACT

Embodiments of the present disclosure are directed to systems and methods for improved cell search of extraterrestrial base stations. Using a dataset of anticipated coverage areas associated with one or more extraterrestrial base stations locally stored on a user equipment (UE) and a location of the UE, the UE can determine if it is within a predetermined threshold distance of the one or more anticipated coverage areas. If so, the UE may perform cell search for the one or more extraterrestrial base stations; if not, the UE may not perform cell search or perform cell search less often to prevent unnecessary battery depletion.

16 Claims, 6 Drawing Sheets

PRECISE NETWORK SEARCHING FOR EXTRATERRESTRIAL BASE STATIONS

SUMMARY

The present disclosure is directed to improving cell search procedures for use with extraterrestrial base stations, substantially as shown and/or described in connection with at least one of the Figures, and as set forth more completely in the claims.

According to various aspects of the technology, a user equipment actively searches for a network when it anticipates that it is located within an area of anticipated coverage by one or more extraterrestrial base stations. Cell search, selection, and reselection are some of the most intensely battery-consuming activities a UE can perform in a modern telecommunications network. Though most populated areas today have at least nearly ubiquitous cellular coverage, there are many times when a UE may depart coverage or otherwise attempt to search for an extraterrestrial base station to select and attach. By performing active cell searching when a UE anticipates coverage, the UE will realize significant power conservation by way of less processing resource utilization.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
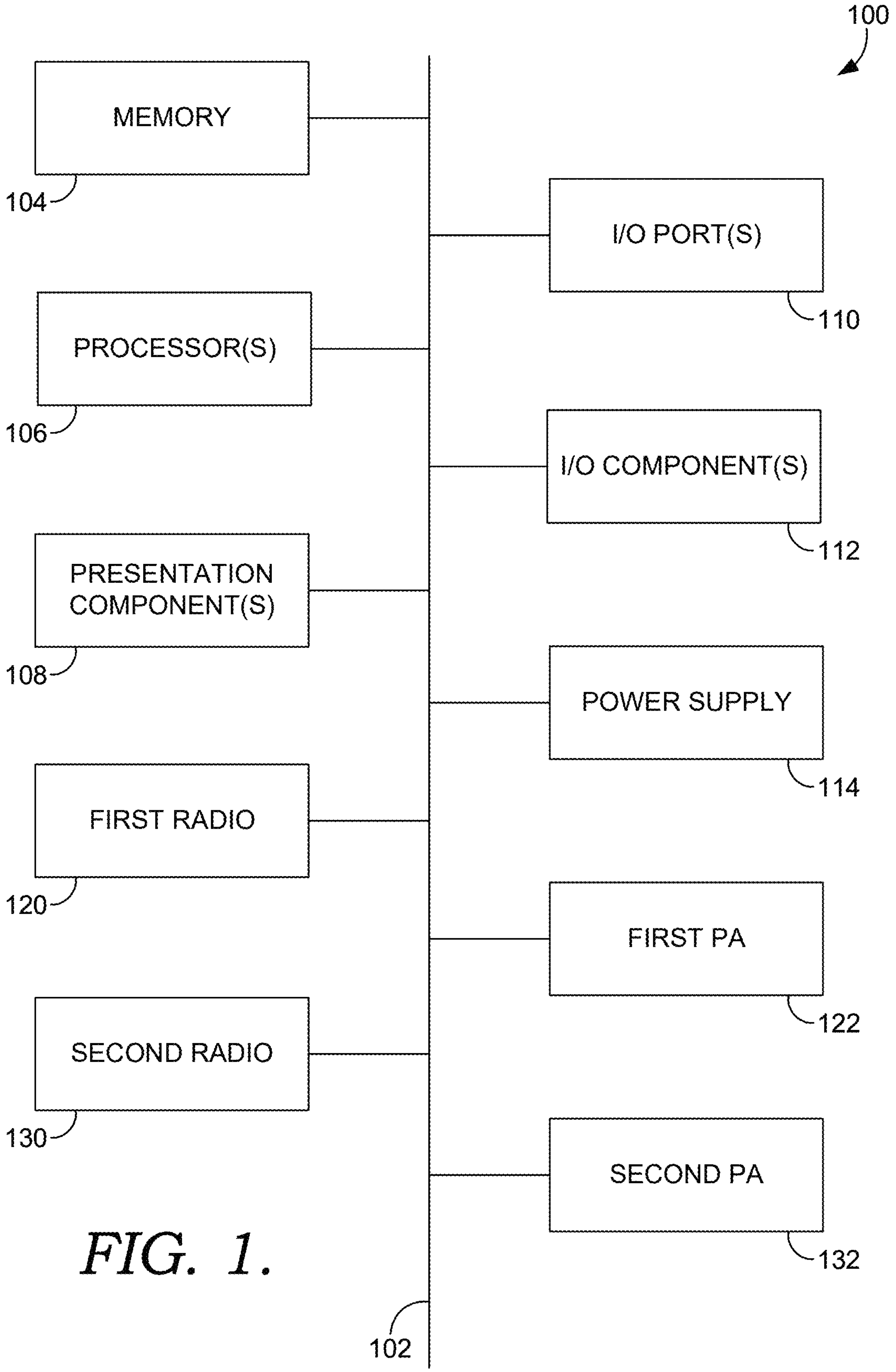
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a particular geographic area. As used herein, an extraterrestrial base station is distinguished from a terrestrial base station on the basis of its lack of ground coupling; some examples of extraterrestrial base stations include airborne (e.g., on an aircraft or airship) and satellites (e.g., low earth orbit (LEO), medium earth orbit (MEO), and geostationary orbit (GEO)). As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, the provision of telecommunication services is moving beyond the surface of the earth at increasing speed. Network operators, once exclusively operating terrestrial base stations, will begin to operate extraterrestrial base stations themselves or utilize third parties to service their subscribers with additional reliability and availability. In some cases, the use of an extraterrestrial base station is planned for times when a user equipment (UE) is beyond range of a terrestrial radio access network (RAN), where UEs actively perform cell search in order to identify available cellular base stations that can be selected and used to communicate with a broader network. Cell search is a power-intense activity conducted by UEs that includes tuning to numerous different frequencies, in some cases all frequencies supported by the UE, to listen for signaling from one or more candidate base stations. Persistent cell searching without connection to an external power supply or frequent re-charging, rapidly depletes the limited battery capacity of the UE.

Conventionally, when UEs are beyond range of the terrestrial RAN, they typically perform cell search according to a predetermined schedule. In some cases, UEs are configured to perform cell search at predetermined intervals. Scanning at shorter intervals decreases the time required for the user equipment to find a cell to camp on, but increases power consumption. Scanning at longer intervals conserves limited UE power but may result in taking longer to find a cell. In some cases, UEs are configured to have variable scanning intervals, wherein the longer the UE has unsuccessfully searched for a base station, the longer the time between subsequent scans. Particularly when a UE has spent an appreciable amount of time beyond wireless coverage and a candidate extraterrestrial base station passes overhead, this can result in the UE missing an opportunity to search, select, and attach to/camp on the base station.

In order to facilitate connectivity between a UE and an extraterrestrial base station, the present disclosure is directed to systems and methods for improved cell search. Unlike conventional solutions, the present disclosure queries a locally stored dataset in order to determine if the UE is located in or near enough to an extraterrestrial base station such that performing cell search is likely to be successful. By using a targeted cell search procedure instead of performing it according to a fixed configuration, the UE will conserve battery power by not searching at a time/location where it is unlikely to succeed, yet improve the likelihood of attaching to an extraterrestrial base station.

Accordingly, a first aspect of the present disclosure is directed to a system for performing cell search of one or more extraterrestrial base stations comprising one or more antennas configured to receive downlink signals from an extraterrestrial base station of a first radio access network, and one or more computer processing components. The one or more computer processing components are configured to perform a method comprising determining the UE is not in a coverage area of a second radio access network. The one or more computer processing components are further configured to determine a location of the UE. The one or more computer processing components are further configured to query a dataset stored locally on the UE comprising an anticipated coverage area associated with an extraterrestrial base station. The one or more computer processing components are further configured to determine the location of the UE is within a predetermined threshold distance of the anticipated coverage area associated with the extraterrestrial base station. The one or more computer processing components are further configured to perform a cell selection procedure.

According to another aspect of the technology described herein, a method for performing cell search in a wireless telecommunication network is presented. The method comprises not performing a cell search procedure for one or more extraterrestrial base stations based on a determination that a user equipment (UE) is within a persistent coverage area of a terrestrial radio access network. The method further comprises performing the cell search procedure for one or more extraterrestrial base stations based on a determination that the UE is outside the persistent coverage area of the terrestrial radio access network. The cell search procedure comprises querying a locally stored dataset comprising anticipated coverage areas of the one or more extraterrestrial base stations. The cell search procedure further comprises determining a location of the UE. The cell search procedure further comprises determining the location of the UE is within a predetermined threshold distance of the anticipated coverage areas of the one or more extraterrestrial base stations. The cell search procedure further comprises scanning one or more downlink frequencies of the one or more extraterrestrial base stations to acquire time and frequency synchronization with a cell associated with the one or more extraterrestrial base stations.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VOLTE, or other VoIP communications. In aspects, the first radio 120 and the second radio 130 may be configured to communicate using the same protocol but in other aspects they may be configured to communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies; for example, the first radio 120 may be configured to communicate with a base station according to a cellular communication protocol (e.g., 4G, 5G, 6G, or the like), and the second radio 130 may configured to communicate with one or more other computing devices according to a local area communication protocol (e.g., IEEE 802.11 series, Bluetooth, NFC, z-wave, or the like).

Figure 2A:
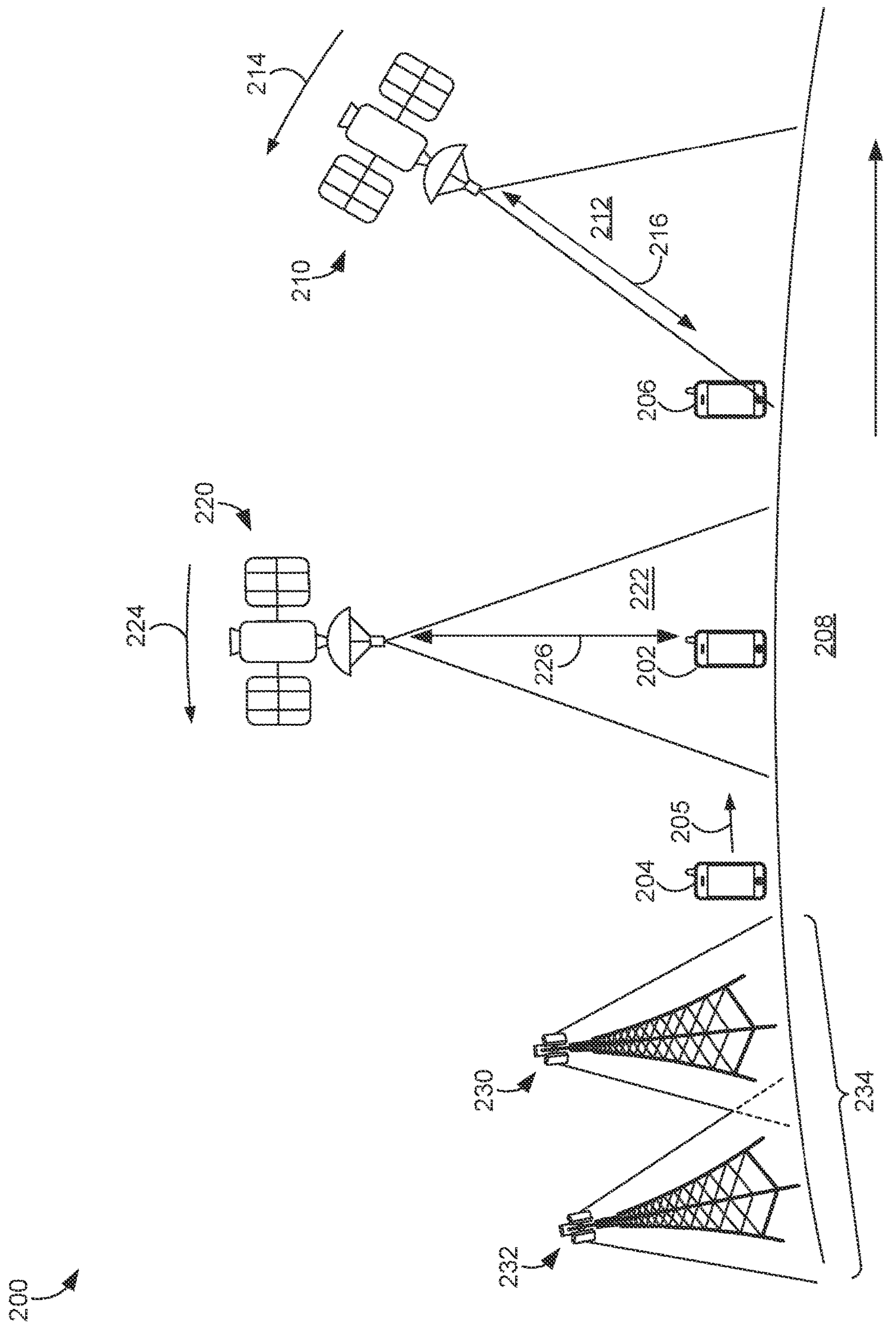
FIGS. 2A-2B illustrates a diagram of an exemplary environment in which implementations of the present disclosure may be employed.
Figure 2B:
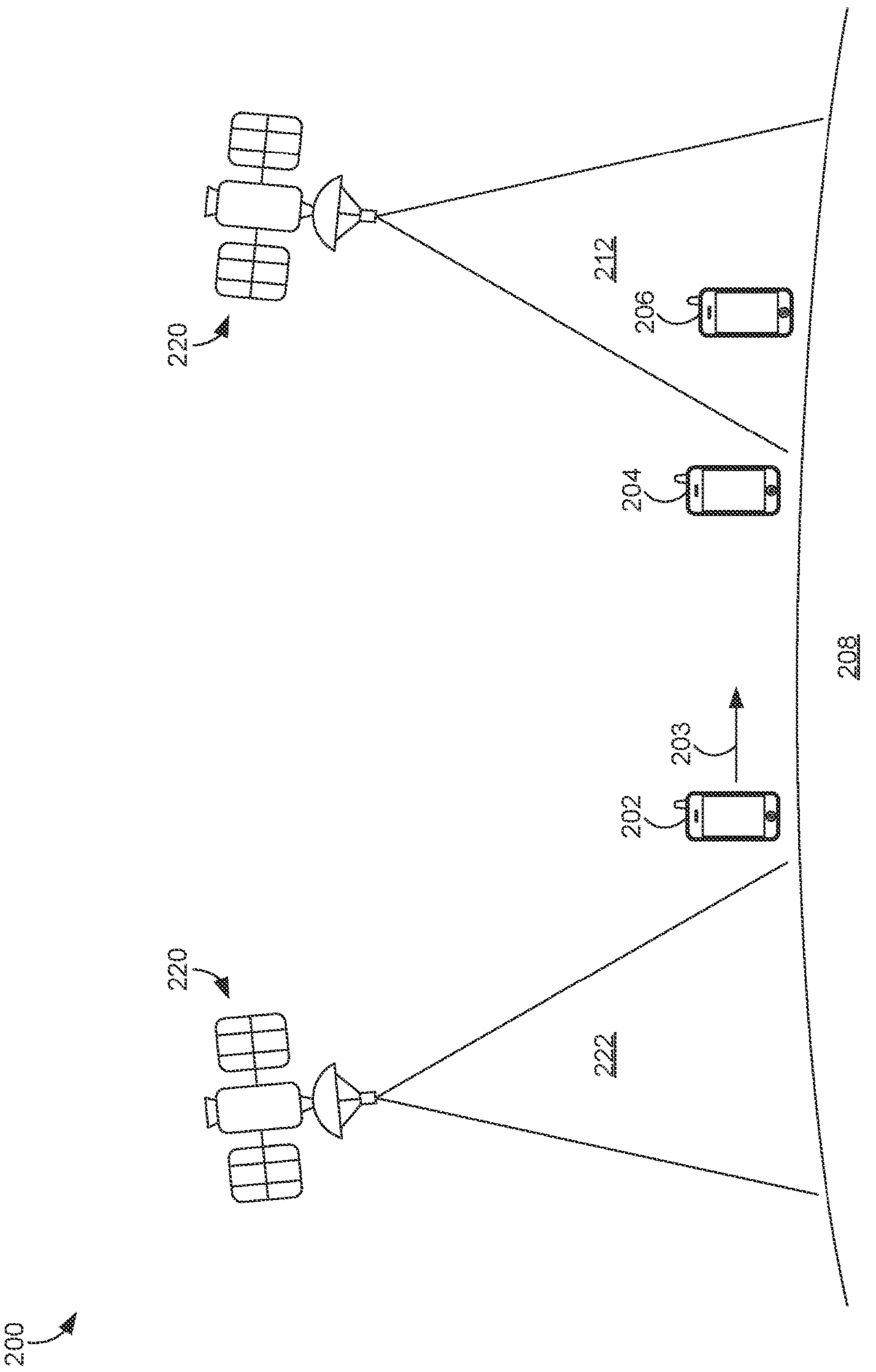

Turning now to FIG. 2A-2B, an exemplary network environment is illustrated in which implementations of the present disclosure may be employed. Such a network environment is illustrated and designated generally as network environment 200. At a high level the network environment 200 comprises a first UE 202, a second UE 204, and a third UE 206 that are at or near ground level of the earth 208, and one or more extraterrestrial base stations, represented in FIG. 2A-2B as a first extraterrestrial base station 210 and a second extraterrestrial base station 220. Though each of the extraterrestrial base stations in FIG. 2A-2B are illustrated as being satellites, it should be understood that the present disclosure is not limited to space-based implementations; either or both of the first extraterrestrial base station 210 and the second extraterrestrial base station 220 may be in the form of an aircraft or any other non-terrestrial base station. Similarly, though each of the UEs are illustrated as cellular phones, a UE suitable for implementations with the present disclosure may be any computing device having any one or more aspects described with respect to FIG. 1.

Each of the first extraterrestrial base station 210 and the second extraterrestrial base station 220 may have any one or more characteristics suitable for use in a wireless telecommunication network environment such as network environment 200. As in the illustrated embodiment, each of the first extraterrestrial base station 210 and the second extraterrestrial base station 220 may take the form of a satellite. Generally, a satellite is characterized by its orbit around the earth. The orbit of any particular satellite will vary by operator desire and/or intended use; for example, a satellite base station suitable for use with the present disclosure may be characterized by its maximum orbital altitude and/or orbital period as Low Earth Orbit (LEO), Medium Earth Orbit (MEO), and High Earth Orbit (HEO). Though not rigidly defined, an LEO satellite may orbit with a maximum orbital altitude of less than approximately 1,250 miles, an MEO satellite may orbit with a maximum orbital altitude generally between 1,250 and 22,000 miles, and an HEO satellite may orbit with a maximum orbital altitude of greater than approximately 22,000 miles. In some, but not all cases, a satellite in HEO may be considered geosynchronous on the basis that its orbital period is approximately equal to the length of a sidereal or solar day (approximately 24 hours); generally, a satellite in geosynchronous orbit will appear to be in the same position relative to a fixed point on the surface of the earth 208 at the same time each day. A geostationary orbit is a special type of geosynchronous orbit with the Earth's equator with each of an eccentricity and inclination equal to zero. Some satellites in HEO and all that are in LEO or MEO have an orbital period that is different than the length of a sidereal/solar day and are considered to be non-geosynchronous and do not remain stationary relative to a fixed position on the surface of the Earth 208.

Each of the first extraterrestrial base station 210 and the second extraterrestrial base station 220 are configured to wirelessly communicate UEs, such as the first UE 202, the second UE 204, and the third UE 206. In aspects, each of the extraterrestrial base stations may communicate with a UE using any wireless telecommunication protocol desired by a network operator, including but not limited to 3G, 4G, 5G, 6G, 802.11x and the like. Though not illustrated so as not to obscure the present disclosure, each of the first extraterrestrial base station 210 and the second extraterrestrial base station 220 may have a wireless connection to one or more ground stations, wherein signals are communicated from a centralized radio station to one or more extraterrestrial base stations so that they may be relayed to UEs on the surface of the Earth 208. In addition to a wireless telecommunication link (also referred to herein as simply a "wireless link") with one or more ground stations, each of the first extraterrestrial base station 210 and the second extraterrestrial base station 220 are configured to wirelessly communicate with one or more UEs on the surface of the Earth 208. For example, the first extraterrestrial base station 210 may establish a first wireless link 216 with the third UE 206 and the second extraterrestrial base station 220 may establish a second wireless link 226 with the first UE 202. Though illustrated as a two-way communication link, either or both of the first wireless link 216 and the second wireless link 226 may be one-way (i.e., downlink only or uplink only) instead of bi-directional (i.e., downlink and uplink). Each of the first extraterrestrial base station 210 and the second extraterrestrial base station 220 may be said to provide wireless telecommunication coverage to a geographic area; as illustrated in FIG. 2, the first extraterrestrial base station 210 may be said to serve a first geographic coverage area 212 and the second extraterrestrial base station 220 may be said to serve a second geographic coverage area 222.

In order to connect to any base station, regardless of whether it is terrestrial or extraterrestrial, a UE must perform an active search to determine which base stations, if any, it is capable of connecting to. This process is known to many in the art and referred to herein as a 'cell search,' and generally comprises acquiring time and frequency synchronization with a cell associated with a base station and detecting an identity of that cell by tuning to one or more specific frequencies, detecting/decoding synchronization signals, detecting/decoding a physical broadcast channel (PBCH), and detecting/decoding the physical downlink shared channel (PDSCH). When performing the cell search, a particular UE typically actively scans frequency bands in which it is capable of communicating for synchronization signals from a base station. Upon detection of synchronization signals from one or more base stations, the UE will perform a cell selection procedure (typically based on best quality of service metrics), perform an attachment procedure with the base station, and then being carrying out a wireless communication session. As noted earlier, cell search procedures are often quite taxing on a UE and, if performed constantly, can lead to rapid and undesirable depletion of a UE's battery. In order to prevent the constant active searching for signals during cell search, the present disclosure is directed to performing active cell searching only when a particular has reason to believe it is in or near a geographic coverage area of a base station.

With continued reference to FIG. 2A, the network environment 200 is illustrated for an improved cell search paradigm with one or more non-geosynchronous satellite base stations. The first UE 202, being well-within the boundaries of the second geographic service area 222 and connected to the second extraterrestrial base station 220 via the wireless communication link 226, may not perform a cell search, whether on the basis that its connection to the second extraterrestrial base station 220 has one or more key performance indicators (KPIs) that exceed a predetermined threshold or simply because it is already attached to base station. According to aspects of the present disclosure, the second UE 204, which may conventionally have performed an active cell search at a predetermined time interval, may not perform cell search because it has determined that it is not within a predetermined threshold distance of a geographic service area of an extraterrestrial base station. The third UE 206 will perform cell search because it has determined that it is within a predetermined threshold distance of a geographic service area of an extraterrestrial base station. In aspects such as the one illustrated in FIG. 2A, each of the first extraterrestrial base station 210 and the second extraterrestrial bas station 220 are non-geosynchronous; that is, the first extraterrestrial base station 210 is moving along a first vector 214 relative to the surface of the Earth 208 and the second extraterrestrial base station 220 is moving along a second vector 224 relative to the surface of the Earth 208. Though illustrated as being generally in the same direction, one skilled in the art would appreciate that extraterrestrial base stations can be deployed in many different orientations and that a comprehensive constellation of extraterrestrial is likely to comprise extraterrestrial base stations that are not moving in the same direction or along the same track.

To more efficiently conduct cell searching, a UE may only execute the cell search process based on a determination that the cell search is likely to be fruitful using anticipated coverage areas associated with one or more extraterrestrial base stations. In order to determine whether or not they should perform cell search, each of the second UE 204 and the third UE 206 will determine its current location (e.g., via GPS or other location data) and determine if they are in or within a predetermined threshold distance of what is anticipated to be a geographic service area associated with one or more extraterrestrial base stations. For example, the second UE 204 may not conduct a cell search (e.g., delay for a predetermined period of time and re-analyze) based on a determination that it is not in an anticipated coverage area or that it is not within a predetermined threshold distance (e.g., 0.1, 0.5, 1, 5, 10, 50 miles, or the like) of the anticipated coverage area of any extraterrestrial base stations. Conversely, the third UE 206 may determine that it is in or near an anticipated coverage area of a base station based on a determination that it is within the predetermined threshold distance of the first geographic service area 212 of the first extraterrestrial base station 210. In order to determine whether or not a particular UE is in or sufficiently near an anticipated coverage area of an extraterrestrial base station, it may query a record (i.e., dataset) that is locally stored on the particular UE and populated by either constellation information obtained from an external source and/or make deductions based on the UE's own observations, and compare the location of the UE with said anticipated coverage area data. In aspects, the locally stored dataset may additionally comprise information about a set of frequencies used by the one or more extraterrestrial base stations and a UE performing cell search for the one or more extraterrestrial base stations may perform the cell search procedure only on the set of frequencies without tuning to frequencies outside of the set of frequencies. In order to ensure the particular UE does not miss re-entry into a terrestrial coverage area, in some aspects the improved cell search disclosed herein may include performing a standard cell search at a predetermined interval (e.g., 30 minutes, 1 hour, 24 hours, or any desirable interval) that is relatively greater than a conventional cell search interval in addition to the targeted cell search for extraterrestrial base stations disclosed herein.

A UE may determine if it is in or sufficiently near a geographic service area based on information the UE receives from an external source. Such external source data may comprise actual coverage area, corresponding to times and locations where the UE can expect coverage or may comprise at least partial constellation information relating to a constellation of extraterrestrial base stations designed to provide wireless telecommunication services to the UE. External data relating to expected coverage area(s) may take any desirable form but would generally be usable to provide the UE with an indication that coverage can be expected in a particular time at a particular location (or within a particular range of a particular location). The UE may be provided with an indication that coverage is to be expected in an area (e.g., a circular, ovular, or hexagonal area) at least partially defined by a radius (e.g., 100 miles) of a center point that at least approximately represents the center point of the geographic coverage area on a particular date and time. For example, external coverage data may indicate that a circular area of coverage will be centered at a geographic location of 41°22'25"N 72°06'05"W and will have a radius of 100 miles at a particular time on a particular day. The UE can utilize the data to determine that is within the 100 mile radius of the geographic center point at that particular on that particular time as a basis for activating a cell search for an extraterrestrial base station. In some aspects, the external source data may take form of a lookup table comprising dates/times, a center point, and a radius of coverage. In other aspects, the external source data may comprise extraterrestrial constellation information.

Figure 4:
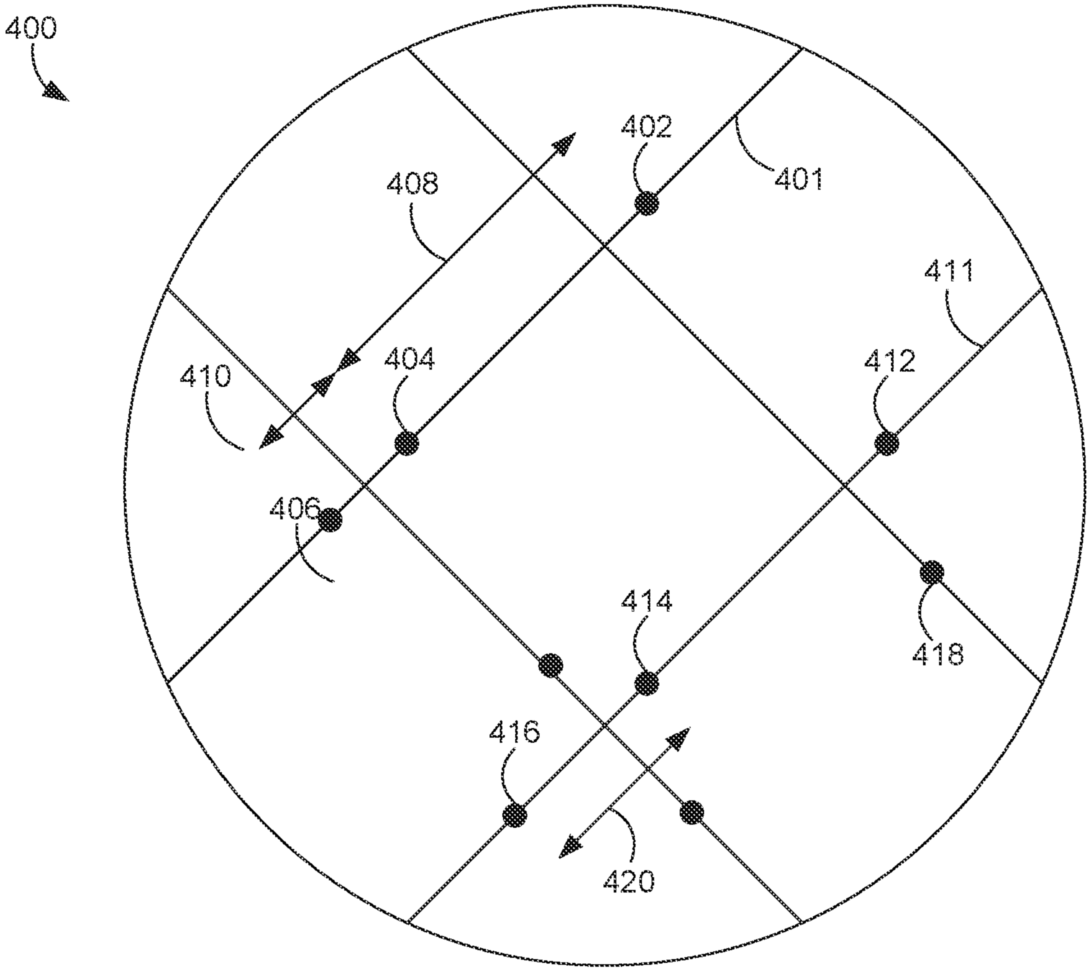
FIG. 4 illustrates a model of a satellite constellation, for use with one or more aspects of the present disclosure.

Turning now to FIG. 4, external source data comprising extraterrestrial constellation information is illustrated. Said constellation information at least partially represents a satellite constellation 400. The constellation data may comprise indications that the satellite constellation includes one or more satellites; for example, the external constellation data may comprise a first satellite 402 which may represent the first extraterrestrial base station 210 of FIG. 2, a second satellite 404 which may represent the second extraterrestrial base station 220 of FIG. 2, a third satellite 406, a fourth satellite 412, a fifth satellite 414, and a sixth satellite 414. The constellation data may include indications that each of the first satellite 402, the second satellite 404, and the third satellite 406 travel along a first orbital path 401. The first satellite 402 may be separated from the second satellite 404 by a first distance 408 and the second satellite 404 may be separated from the third satellite 406 by a second distance 410, wherein the first distance 408 may be equal to or different than the second distance 410. Similarly, constellation data may comprise include information that each of the fourth satellite 412, the fifth satellite 414, and the sixth satellite 416 travel along a second orbital path 411. The fourth satellite 412 may be separated from the second satellite 414 by a third distance 418 and the fifth satellite 414 may be separated from the sixth satellite 416 by a fourth distance 420, wherein the third distance 418 may be equal to or different than the fourth distance 420, the first distance 408, and the second distance 410. Based on the external constellation data comprising the time, location, and track of one or more satellites, the UE can model, calculate, or otherwise determine, in combination with a determination of its current position on the surface of the earth (e.g., by way of the UE's native GPS sensor(s)), when service is expected at said current position.

Returning to FIG. 2A, external source expected coverage data may be localized (e.g., focused on a relatively small radius in the vicinity of a remote campsite) or may be provided for a predetermined range (e.g., 10, 50, or 100 miles) beyond a persistent coverage area 234, wherein the persistent coverage area 234 is defined as an area where UEs are expected to have persistent coverage with one or more radio access networks (e.g., based on a greater than threshold likelihood of successfully camping on a base station). In aspects, the persistent coverage area 234 may be only based on service from a particular type of radio access network, such as terrestrial base stations or from radio access nodes of a particular carrier/operator (e.g., having a common carrier identifier such as a public land mobile network number, access point name, or the like).

External source expected coverage data may be manually obtained based on a user input or automatically obtained based on UE activity. The second UE 204 may receive an input from a user that requests the external source expected coverage data (e.g., if a user knows or suspects they will be (or are likely to be) beyond a persistent coverage area 234. For example, the user of the second UE 204 may be heading to a remote campsite where they do not expect constant telecommunication coverage (whether from terrestrial base stations, extraterrestrial base stations, or both); accordingly, the second UE 204 may receive a manual indication from a user that can be used to obtain the external source expected coverage data for a particular location or area. That external source expected coverage data can then be utilized by the second UE 204 at a later time to determine, for example, the expected coverage associated with the first geographic service area 212 and the second geographic service area 222.

External source expected coverage data may additionally or alternatively be obtained automatically based on UE activity. In such an aspect, a UE may obtain the external source expected coverage data based on a determination that the UE is, or is likely, to depart the persistent coverage area 234. For example, the first UE 202 or a network operator may determine that the first UE 202 is scheduled to depart a persistent coverage area based on travel itinerary information for a user associated with the first UE 202 (e.g., airplane tickets, hotel/campsite reservations, charter boat booking, etc.), based on a pattern of behavior (e.g., the first UE 202 departs a persistent coverage area every weekend), and/or based on movement of the first UE 202 towards the edge of a persistent coverage area (e.g., a sequence of handovers indicates the first UE 202 is advancing towards the edge of a persistent coverage area). Regardless of the particular basis, upon a determination that the first UE 202 is forecasted to depart the persistent coverage area 234, external source expected coverage data may be pushed to or otherwise downloaded by the first UE 202 prior to departure from the persistent coverage area.

Turning now to FIG. 2B, the network environment 200 is illustrated for the purposes of showing an instance when a UE may not perform cell search despite being with range of an anticipated coverage area. In one aspect, if the first UE 202 determines it is within a predetermined distance of the second geographic service area 222 (in which it anticipates coverage from the second extraterrestrial base station 220 according to any one or more aspects disclose herein) and if the first UE 202 also determines that it is moving on a vector 203 away from the second geographic service area 222, then it may not perform a cell search because of the likelihood that the first UE 202 will not enter the second geographic service area 222 (and cell search will fail).

Figure 3:
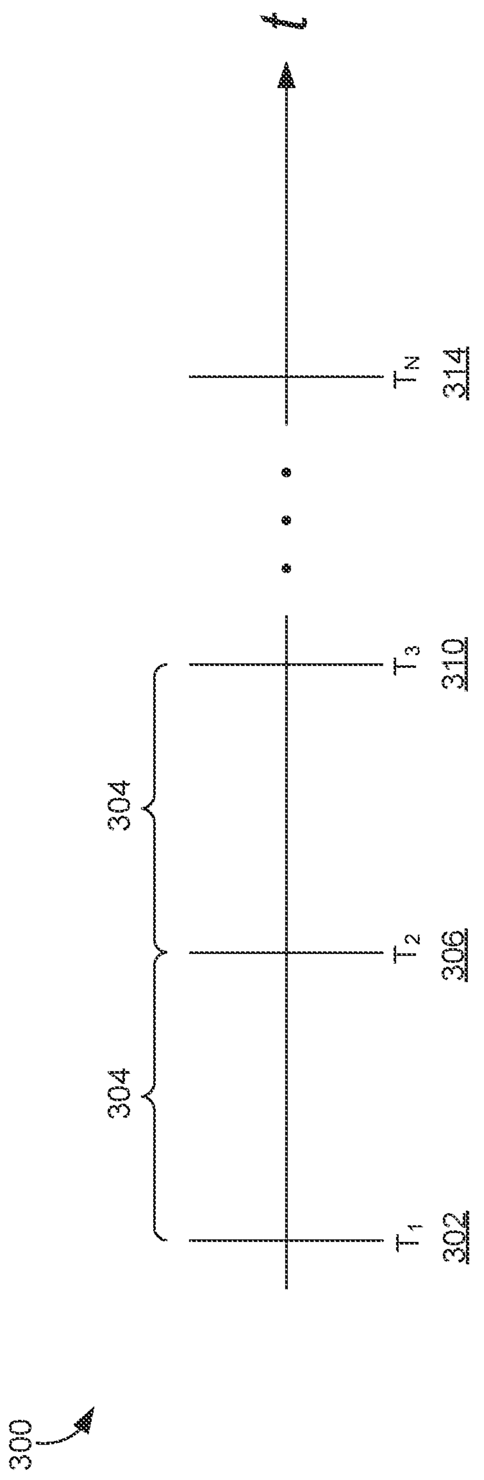
FIG. 3 illustrates a timing diagram used to observe and estimate extraterrestrial coverage, according to one or more aspects described herein.

A UE may determine if it is in or sufficiently near a geographic service area based on a query of a local record populated by the UE's own observations. Referring to a timeline 300 of FIG. 3, the third UE 206 of FIGS. 2A-2B may detect a set of synchronization signals from the first extraterrestrial base station 210 (e.g., using a cell identifier) at a particular location (e.g., using a GPS positioning sensor of the third UE 206) at a first time 302 and a subsequent second time 306. Accordingly, the third UE 206 of FIG. 2A may determine that the first extraterrestrial base station 210 provides coverage for the particular location at an interval equal to an amount of time 304. At a third time 310 equal to the amount of time 304 after the second time 306, the third UE 206 of FIG. 2A may initiate cell searching based on a determination that it is at or within a predetermined distance of its location at the first time 302 and the second time 306. For example, referring back to FIG. 2A, the third UE 206 may determine that it is within the first geographic service area 212 of the first extraterrestrial base station 210 at 11:00 pm Greenwich Mean Time (GMT) on a Friday at a position on the surface of the Earth 208 determined by a GPS sensor of the third UE 206 to be 38.9346 degrees north, 94.6313 degrees west. Based on a determination by the third UE 206 that it is again in the first geographic service area 212 at the same position at 11:00 pm GMT on Saturday, the third UE 206 may determine that the first extraterrestrial base station 210 has an orbital period of 24 hours at that particular location. Utilizing this observed orbital data, the third UE 206 may initiate or otherwise perform cell searching based on a determination that it is within a predetermined range (e.g., 0.5, 1, 5, 10, 25 miles, or any desirable distance stipulated by a handset manufacturer or network operator) of the same position at 11:00 pm GMT on a subsequent day. Though the preceding example utilizes an orbital time of 24 hours, a person having skill in the art would understand that any non-geosynchronous orbit could be suitable within the disclosed framework.

Figure 5:
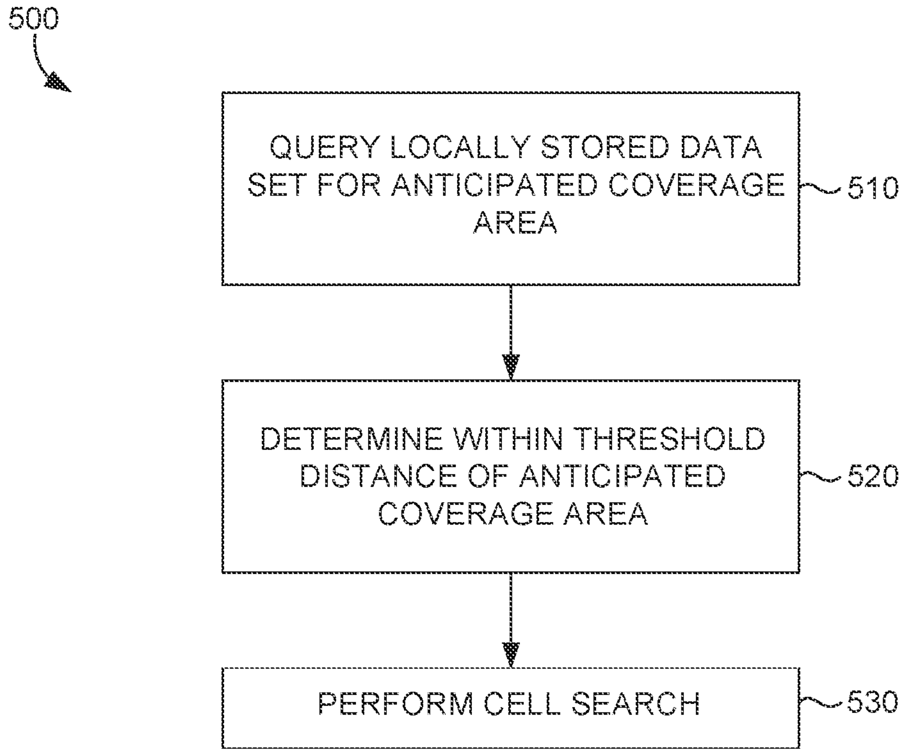
FIG. 5 depicts a flow diagram of an exemplary method for multi-satellite downlink connectivity, in accordance with embodiments described herein.

Turning now to FIG. 5, a flow chart representing a method 500 is provided. At a first step 510, a UE queries a locally stored dataset to determine an anticipated coverage area of one or more extraterrestrial base stations, according to any one or more aspects described with respect to FIGS. 2A-4. At a second step 520, the UE determines that it is in or within a predetermined range of an anticipated coverage area of one or more extraterrestrial base stations, according to any one or more aspects described with respect to FIGS. 2A-4. At a third step 530, the UE performs a cell search in an attempt to select and attach to the one or more extraterrestrial base stations, according to any one or more aspects described with respect to FIGS. 2A-4.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for performing cell search of one or more extraterrestrial base stations, the system comprising:

one or more antennas configured to receive downlink signals from an extraterrestrial base station of a first radio access network; and one or more computer processing components configured to perform operations comprising:

determining the UE is not in a coverage area of a second radio access network, wherein the second radio access network is a terrestrial radio access network;

determining a location of the UE;

querying a dataset stored locally on the UE comprising an anticipated coverage area associated with an extraterrestrial base station;

determining the location of the UE is within a predetermined threshold distance of the anticipated coverage area associated with the extraterrestrial base station; and performing a cell selection procedure, wherein performing the cell selection procedure comprises tuning exclusively to a set of downlink frequencies stored in the dataset without performing a blind frequency scan, and wherein the UE performs a standard cell search at a predetermined interval that is longer than a conventional cell search interval as a fallback mechanism.

2. The system of claim 1, wherein the dataset further comprises a set of downlink frequencies used by the extraterrestrial base station to communicate with the UE.

3. The system of claim 2, wherein the cell selection procedure comprises tuning to the set of downlink frequencies used by the extraterrestrial base station without tuning to frequencies supported by the UE outside of the set of downlink frequencies used by the extraterrestrial base station to communicate with the UE.

4. The system of claim 3, wherein the dataset is created based on historical observations by the UE of the extraterrestrial base station.

5. The system of claim 3, wherein the dataset is created based an external data source.

6. The system of claim 3, wherein the dataset is created on the UE based on a determination that the UE is departing a persistent coverage area.

7. The system of claim 6, wherein the dataset comprises anticipated coverage areas for one or more extraterrestrial base stations for a predetermined range beyond the persistent coverage area.

8. The system of claim 1, wherein the dataset is created based on an input received at the UE.

9. The system of claim 8, wherein the input comprises a target location and the dataset comprises anticipated coverage areas for one or more extraterrestrial base stations within a predetermined distance of the target location.

10. A method for cell searching comprising:

determining a location of a user equipment (UE);

determining the UE is not in a coverage area of a terrestrial radio access network;

querying a dataset stored locally on the UE comprising an anticipated coverage area associated with an extraterrestrial base station, wherein the dataset further comprises a set of downlink frequencies used by the extraterrestrial base station to communicate with the UE;

determining the location of the UE is within a predetermined threshold distance of the anticipated coverage area associated with the extraterrestrial base station; and performing a cell selection procedure comprising tuning to the set of downlink frequencies used by the extraterrestrial base station without tuning to frequencies supported by the UE outside of the set of downlink frequencies used by the extraterrestrial base station to communicate with the UE, wherein the dataset is created based on historical observations by the UE of the extraterrestrial base station, the historical observations comprising detecting synchronization signals from the extraterrestrial base station at a first time and a second time at a particular location, and wherein the dataset comprises a calculated orbital period equal to a time interval between the first time and the second time, the calculated orbital period being used to predict future coverage at the particular location.

11. The method of claim 10, wherein the dataset comprises a date and time the anticipated coverage area of the extraterrestrial base station within the predetermined threshold distance of the location of the UE.

12. The method of claim 11, wherein the method further comprises creating the dataset stored locally on the UE based on input received at the UE.

13. The method of claim 12, wherein the input comprises a target location and the dataset comprises anticipated coverage areas for one or more extraterrestrial base stations within a predetermined distance of the target location.

14. The method of claim 11, wherein the dataset is created and stored locally on the UE based on a determination that the UE is departing a persistent coverage area.

15. The method of claim 14, wherein the dataset comprises anticipated coverage areas for one or more extraterrestrial base stations for a predetermined range beyond the persistent coverage area.

16. A method for performing cell search in a wireless telecommunication network, the method comprising:

based on a determination that a user equipment (UE) is within a persistent coverage area of a terrestrial radio access network, not performing a cell search procedure for one or more extraterrestrial base stations; and based on a determination that the UE is outside the persistent coverage area of the terrestrial radio access network, performing the cell search procedure for one or more extraterrestrial base stations, the cell search procedure comprising:

querying a locally stored dataset comprising anticipated coverage areas of the one or more extraterrestrial base stations, wherein the locally stored dataset further comprises a set of downlink frequencies used by the one or more extraterrestrial base stations, and wherein the locally stored dataset is created based on an external data source comprising constellation data indicating that a plurality of extraterrestrial base stations travel along at least one orbital path with known separation distances between the extraterrestrial base stations, and wherein the dataset is created by the UE modeling when service is expected at a current position of the UE based on the constellation data and the current position;

determining a location of the UE;

determining the location of the UE is within a predetermined threshold distance of the anticipated coverage areas of the one or more extraterrestrial base stations; and scanning one or more downlink frequencies of the one or more extraterrestrial base stations to acquire time and frequency synchronization with a cell associated with the one or more extraterrestrial base stations, wherein scanning the one or more downlink frequencies comprises tuning to the set of downlink frequencies without tuning to frequencies supported by the UE outside of the set of downlink frequencies.

* * * * *